Patented Mar. 23, 1948

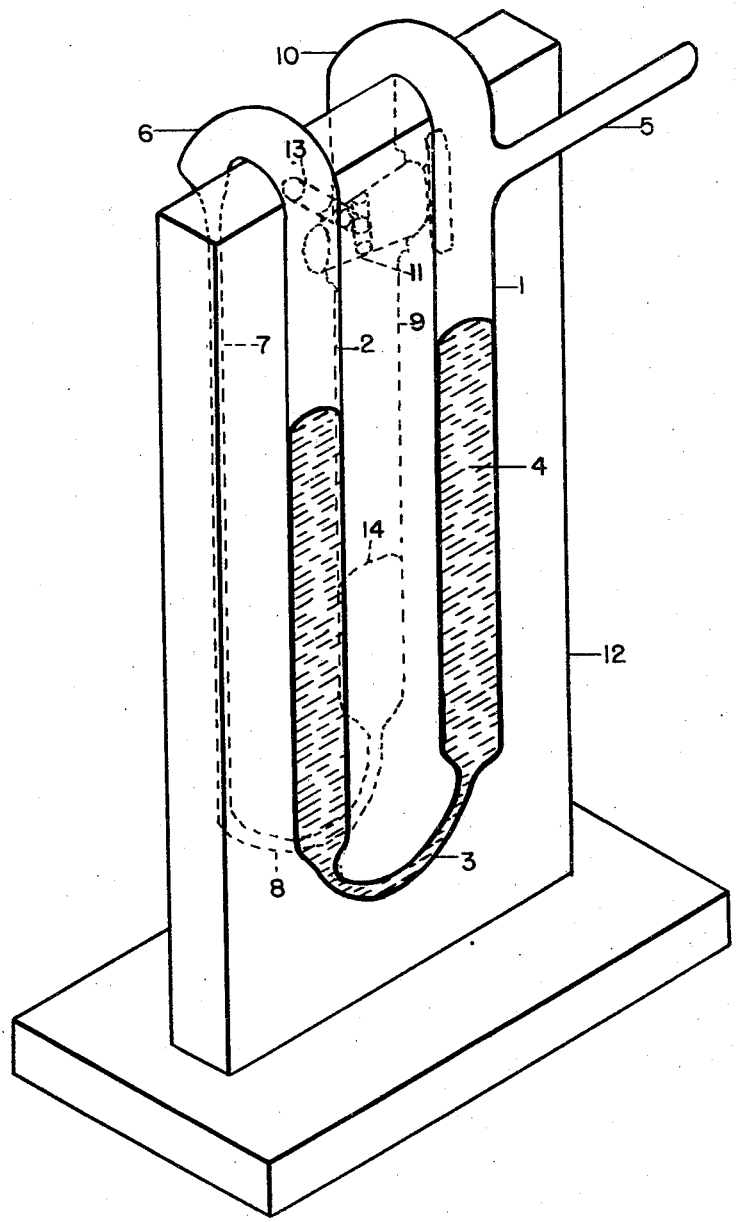

2,438,228

UNITED STATES PATENT OFFICE 2,438,228

MANOMETER

Reuben A. Osten, Wilmington, Del., assignor to Wyandotte Chemicals Corporation, Wyandotte, Mich., a corporation of Michigan.

Application September 14, 1945, Serial No. 616,190

3 Claims. (Cl. 73—401)

The present invention relating as indicated, to a manometer, has more particular reference to a closed U-tube type of pressure (or vacuum) measuring device, in which the U-tube is filled with a liquid, such as mercury, and one arm of the tube contains a vacuum space and the other arm of the tube is connected to the gas or vapor source whose pressure is to be measured.

In the distillation of organic chemical materials, manometers of this general type are customarily used to measure the pressure of the gases or vapors involved. Since the mercury in the manometer becomes quite frequently contaminated with organic chemicals, it becomes desirable to remove and replace the mercury from time to time with purified, uncontaminated mercury. Furthermore, in the ordinary simple type of close U-tube manometer, the replacement of the mercury body is not only difficult insofar as technique is concerned, but also the residual pressure in the barometric vacuum column of the U-tube is difficult to control, one of the factors leading to such difficulty being the presence of traces of air adhering to the glass. Such variation in control and maintenance of the uniformity of the barometric vacuum, of course, leads to error in the pressure reading obtained by the manometer.

It is, therefore, the general object and nature of my invention to provide a manometer construction wherein the mercury body may be simply and conveniently removed and replaced, and the barometric vacuum may be accurately established and maintained.

A further object of my invention is to provide a manometer construction wherein the likelihood of breakage when the vacuum is suddenly released, is practically eliminated.

My invention also provides a manometer construction which, while attaining the foregoing objections and advantages, also eliminates complicated reservoirs, multiple stopcocks and connections which have heretofore been employed and have been regarded as necessary in the construction of an accurate manometer.

To the accomplishment of these and additional objectives and to enable any person skilled in the art readily to understand and practice the invention, the following full and concise description and annexed drawing set forth the best mode in which I have contemplated applying the principle thereof.

The annexed drawing is a view in isometric perspective, illustrating a manometer embodying the principle of my invention.

Now referring more particularly to the drawing, the manometer shown therein consists of a U-tube having two vertical arms or tubes 1 and 2 respectively, joined by the connecting arm 3 at their lower ends. As will be noted from the relative dimensions as shown in the drawing, the vertical tubes 1 and 2 are of non-capillary size (i. e. about ¼" or greater in internal diameter) and the tube 3 is of capillary size. The U-tube consisting of the elements 1, 2 and 3 is filled with a body of mercury 4 and a pressure connection 5 leads into the tube 1 adjacent the upper end of the latter. Thus, the pressure of any gas or vapor introduced through the connection 5, will be indicated by the difference in height of the mercury columns in the tubes 1 and 2. As is well known to those skilled in the art an appropriate measuring scale (not shown) is placed adjacent the tubes 1 and 2 in order to ascertain such mercury column height reading.

The vertical tube 2 is connected at its upper end as indicated by the reverse bend 6 to the capillary tube 7 which in turn is connected through the reverse bend 8 to the non-capillary tube 9. The upper ends of the tubes 1 and 9 are connected by the reverse bend 10.

A three-way stopcock 11 is mounted on the tube 9 adjacent its upper end and has its internal parts so arranged as to permit connections to be made alternatively from the atmospheric outlet 13 to the interior of the tube 9, from the atmospheric outlet 13 to the interior of the reverse bend 10, to close off the atmospheric outlet to the interior of both of the tubes 9 and 10, and finally to make a through connection from the tube 9 to the reverse bend 10.

It will thus be seen that my manometer construction is relatively simple, consisting of four parallel vertical tubes 1, 2, 7 and 9, each one of one pair of such tubes (1 and 2) being connected at their upper ends to each of the other pair of tubes (7 and 9), and each pair being connected to each other at their bottom ends. The capillary tube sections 3, 7, and 8 operate not only as a means for reducing the volume of mercury required to be used in the device, but also aid in preventing too rapid surges of flow of the mercury within the tubes in the event of a sudden breaking of the vacuum.

The operation on my above described manometer is as follows:

Assuming that the manometer is essentially empty, clean and purified mercury is poured into the connection 5 to the tubes 1, 2 and 3 until the tubes 1 and 2 are about two-thirds full, or substantially as indicated by the height of the mercury body 4 in the drawing. While the mercury is so poured into the arms 1 and 2, the stopcock 11 is turned to a position where the tube 9 is connected to the atmospheric outlet 13, thus permitting air to be expelled ahead of the mercury from the vertical tubes 1, 2, 7 and 9.

The stopcock 11 is then turned to a position closing the tube 9 from the atmospheric outlet 13 and connecting it to the tube 10, and a flame is played along the arms 1 and 2 in order to expel any adsorbed or occluded air. Simultaneously the connection 5 is connected to a vacuum pump in order to aid in such air expulsion.

In order to establish the barometric vacuum above the mercury in the tube 2, the stopcock 11 is turned to a third position making connection from the tube 10 to the atmospheric outlet 13. This operation creates an increase in the pressure on the column of mercury in the tube 1 as compared to that in the tubes 2, 6, 7, 8 and 9. The vacuum pump is preferably allowed to remain running and connected, so that a convenient control of the pressure differential is thereby obtained and so there is not too great a rush of atmospheric pressure air into the tube 1, as some of the air coming in from the outlet 13 is withdrawn through the connection 5. The body of mercury is then caused to overflow from the arm 2 through the reverse bend 6, and into the tubes 7, 8 and 9. When the mercury level reaches the bottom of the tube 1, the stopcock 11 is turned to its completely closed position. By then connecting the arm 5 to the vacuum pump, the mercury is drawn back towards its normal position as shown in the drawing, thereby establishing the barometric vacuum above the mercury in the tube 2. The mercury body or column will break or separate at a point between the tubes 2 and 7, leaving some residual mercury in the bottom of the U formed by the tubes 7 and 9, or substantially as indicated at 14. Thus, it will be seen that my manometer construction not only lends itself to a simple and convenient filling operation, but also where it is merely desired to regenerate the barometric vacuum, since all that the operator need do is to manipulate the stopcock 11 and does not have to shut off or disconnect the vacuum pump or system.

The manometer is now ready for use and by connecting the source of gas or vapor pressure to the arm or connection 5, the difference in height between the mercury columns in the tubes 1 and 2 will give a reading of the absolute pressure.

When it is necessary to empty the mercury from the manometer, for purposes of replacement of contaminated mercury with new purified mercury, the stopcock 11 is turned to such a position as to bleed air into the tube 9 from the atmospheric outlet 13, while a gentle vacuum is applied at the connection 5. This causes the mercury to flow back out from the tubes 9 and 7, 2 and 1, respectively, and in the order named, and permits the mercury to be removed through the connection 5.

My above described manometer construction is particularly suitable for measuring pressures approaching atmospheric, in which instances the arms 1 and 2 are made relatively long, viz. on the order of 760 mm. in length.

Other modes of applying the principle of my invention, in addition to the one hereinabove described and illustrated in detail, may be employed, provided the structural elements stated by any of the following claims or the equivalent of such elements be utilized.

I, therefore, particularly point out and distinctly claim as my invention and discovery:

1. A manometer comprising a vertical U-tube adapted to contain a body of mercury, a pair of auxiliary vertical tubes each connected at their upper end to the upper end of each arm of said U-tube, and connected to each other at their lower ends, an outlet at the upper end of one of said U-tube arms adapted to be connected to the source of pressure to be measured, a port adjacent the upper end of one of said auxiliary tubes and leading to the atmosphere, and a three-way valve located in said last-named tube at said port.

2. A manometer comprising a vertical U-tube adapted to contain a body of mercury, said U-tube consisting of two non-capillary arms joined at their bottom ends by a capillary tube, a vertical capillary tube connected at its top to the top of one of said arms, a non-capillary tube connected at its lower end with the lower end of said vertical capillary tube and at its top to the top of the other of said arms, an outlet connection adjacent the upper end of said last-named arm leading to the source of pressure to be measured, a port leading to the atmosphere and located between said non-capillary tube and said last-named U-tube arm, and a three-way valve located at said port.

3. A manometer comprising four parallel vertical tubes, one pair of said tubes being connected at their upper ends to the upper ends of the other pair of tubes, the bottom ends of each of said pairs of tubes being connected to each other, a pressure port adapted for connection to a source of pressure and an outlet port leading to the atmosphere adjacent one of the connections between the upper ends of said tubes, and a valve located adjacent said outlet port and adapted alternatively, to open said outlet port to said one of said connections and to close it to the tube in which said outlet port is located, and to make the reverse of such valving connection, said valve being also adapted to make a through connection between said last-named tube and said one of said connections when said outlet port is closed.

REUBEN A. OSTEN.

REFERENCES CITED

The following references are of record in the file of this patent:

UNITED STATES PATENTS

| Number | Name | Date |
| --- | --- | --- |
| 2,051,740 | Palkin | Aug. 18, 1936 |
| 2,075,326 | Zimmerli | Mar. 30, 1937 |